United States Patent
Patel et al.

(10) Patent No.: US 11,822,370 B2
(45) Date of Patent: Nov. 21, 2023

(54) CONCURRENT MULTIPROTOCOL ACCESS TO AN OBJECT STORAGE SYSTEM

(71) Applicant: Nutanix, Inc., San Jose, CA (US)

(72) Inventors: Arth Patel, Vadodara (IN); Dheer Moghe, Shahpura Bhopal (IN); Sajal Jindal, Uttarakhand (IN)

(73) Assignee: Nutanix, Inc., San Jose, CA (US)

( * ) Notice: Subject to any disclaimer, the term of this patent is extended or adjusted under 35 U.S.C. 154(b) by 87 days.

(21) Appl. No.: 17/150,081

(22) Filed: Jan. 15, 2021

(65) Prior Publication Data

US 2022/0164387 A1  May 26, 2022

(30) Foreign Application Priority Data

Nov. 26, 2020 (IN) .............................. 202041051474

(51) Int. Cl.
*G06F 16/00* (2019.01)
*G06F 16/13* (2019.01)

(52) U.S. Cl.
CPC .................................. *G06F 16/13* (2019.01)

(58) Field of Classification Search
CPC ...................................................... G06F 16/13
See application file for complete search history.

(56) References Cited

U.S. PATENT DOCUMENTS

| | | | |
|---|---|---|---|
| 5,802,309 A | 9/1998 | Cook et al. | |
| 6,209,128 B1 | 3/2001 | Gerard et al. | |
| 6,775,673 B2 | 8/2004 | Mahalingam et al. | |
| 7,395,279 B2 | 7/2008 | Iyengar et al. | |
| 7,461,912 B2 | 12/2008 | Kamiyama et al. | |
| 7,653,668 B1 | 1/2010 | Shelat et al. | |
| 7,685,109 B1 | 3/2010 | Ransil et al. | |
| 7,721,044 B1 | 5/2010 | Chatterjee et al. | |
| 8,019,732 B2 | 9/2011 | Paterson-Jones et al. | |
| 8,166,128 B1 | 4/2012 | Faulkner et al. | |
| 8,250,033 B1 | 8/2012 | De Souter et al. | |
| 8,312,027 B2 | 11/2012 | Lamb et al. | |
| 8,352,424 B2 | 1/2013 | Zunger et al. | |
| 8,549,518 B1 | 10/2013 | Aron et al. | |
| 8,554,724 B2 | 10/2013 | Zunger | |

(Continued)

FOREIGN PATENT DOCUMENTS

| | | | |
|---|---|---|---|
| CN | 113406169 A | 9/2021 | |
| EP | 4006737 A1 * | 6/2022 | ......... G06F 16/9017 |

(Continued)

OTHER PUBLICATIONS

OpenStack. OpenStack Object Storage API V1 Reference—API V1 .<https://docs.huihoo.com/openstack/archive/api/openstack-object-storage/1.0/os-objectstorage-devguide-1.0.pdf>. 2014. (Year: 2014).*

(Continued)

*Primary Examiner* — Syed H Hasan
(74) *Attorney, Agent, or Firm* — Foley & Lardner LLP (57) ABSTRACT

In accordance with some aspects of the present disclosure, a non-transitory computer readable medium is disclosed. The non-transitory computer readable medium includes instructions when executed by a processor cause the processor to write an object to an object store using an object-based access protocol, look up the object from the object store using a file-based access protocol, and create one or more directories on-demand in the object store.

26 Claims, 6 Drawing Sheets

(56) References Cited

U.S. PATENT DOCUMENTS

| | | | |
|---|---|---|---|
| 8,601,473 B1 | 12/2013 | Aron et al. |
| 8,683,112 B2 | 3/2014 | Drobychev et al. |
| 8,799,222 B2 | 8/2014 | Marathe et al. |
| 8,849,759 B2 | 9/2014 | Bestler et al. |
| 8,850,130 B1 | 9/2014 | Aron et al. |
| 8,863,124 B1 | 10/2014 | Aron |
| 8,930,693 B2 | 1/2015 | Holt et al. |
| 8,997,088 B2 | 3/2015 | Gurikar et al. |
| 9,003,335 B2 | 4/2015 | Lee et al. |
| 9,009,106 B1 | 4/2015 | Aron et al. |
| 9,043,372 B2 | 5/2015 | Makkar et al. |
| 9,043,567 B1 | 5/2015 | Modukuri et al. |
| 9,052,942 B1 | 6/2015 | Barber et al. |
| 9,069,708 B2 | 6/2015 | Gill et al. |
| 9,069,983 B1 | 6/2015 | Nijjar |
| 9,110,882 B2 | 8/2015 | Overell et al. |
| 9,256,498 B1 | 2/2016 | Leibowitz et al. |
| 9,336,132 B1 | 5/2016 | Aron et al. |
| 9,342,253 B1 | 5/2016 | Muthukkaruppan et al. |
| 9,350,623 B2 | 5/2016 | Shadi et al. |
| 9,405,806 B2 | 8/2016 | Lysne et al. |
| 9,652,265 B1 | 5/2017 | Narayanasamy et al. |
| 9,705,970 B2 | 7/2017 | Pomerantz et al. |
| 9,747,287 B1 | 8/2017 | Bhardwaj et al. |
| 9,772,866 B1 | 9/2017 | Aron et al. |
| 9,805,054 B2 | 10/2017 | Davis et al. |
| 10,003,650 B2 | 6/2018 | Shetty et al. |
| 10,095,549 B1 | 10/2018 | Needham et al. |
| 10,120,902 B2 | 11/2018 | Erdogan et al. |
| 10,152,428 B1 | 12/2018 | Alshawabkeh et al. |
| 10,176,225 B2 | 1/2019 | Naidu et al. |
| 10,296,255 B1 | 5/2019 | Tummala |
| 10,380,078 B1 | 8/2019 | Kumar et al. |
| 10,409,837 B1 | 9/2019 | Schmidt et al. |
| 10,528,262 B1 | 1/2020 | Shmuylovich et al. |
| 10,565,230 B2 | 2/2020 | Zheng et al. |
| 10,592,495 B1 | 3/2020 | Shami et al. |
| 10,659,520 B1 | 5/2020 | Sethuramalingam et al. |
| 10,691,464 B1 | 6/2020 | Drego et al. |
| 10,725,826 B1 | 7/2020 | Sagar et al. |
| 10,740,302 B2 | 8/2020 | Slik et al. |
| 10,747,752 B2 | 8/2020 | Krishnaswamy et al. |
| 10,802,975 B2 | 10/2020 | Gottin et al. |
| 10,915,497 B1 | 2/2021 | Bono et al. |
| 11,086,545 B1 | 8/2021 | Dayal et al. |
| 11,099,938 B2 | 8/2021 | Desai et al. |
| 2001/0034733 A1* | 10/2001 | Prompt | G06F 16/252 |
| | | | 707/999.102 |
| 2002/0065776 A1* | 5/2002 | Calder | G06F 21/52 |
| | | | 705/51 |
| 2002/0078065 A1* | 6/2002 | Agulhon | G06F 16/10 |
| 2003/0023587 A1 | 1/2003 | Dennis et al. |
| 2003/0145310 A1* | 7/2003 | Thames | G06F 8/73 |
| | | | 715/205 |
| 2003/0172094 A1* | 9/2003 | Lauria | G06F 16/162 |
| 2003/0191745 A1* | 10/2003 | Jiang | G06F 16/10 |
| 2004/0186826 A1 | 9/2004 | Choi et al. |
| 2005/0273571 A1 | 12/2005 | Lyon et al. |
| 2006/0041661 A1* | 2/2006 | Erikson | G06F 16/9024 |
| | | | 707/E17.115 |
| 2006/0047636 A1 | 3/2006 | Mohania et al. |
| 2006/0080443 A1* | 4/2006 | Kruglick | G06F 9/544 |
| | | | 709/227 |
| 2006/0080646 A1 | 4/2006 | Aman |
| 2006/0161704 A1 | 7/2006 | Nystad et al. |
| 2007/0088744 A1* | 4/2007 | Webber | G06F 16/10 |
| 2008/0034307 A1* | 2/2008 | Cisler | G06F 3/0481 |
| | | | 715/764 |
| 2009/0171697 A1 | 7/2009 | Glauser et al. |
| 2009/0327621 A1 | 12/2009 | Kliot et al. |
| 2010/0042673 A1 | 2/2010 | Dayley |
| 2010/0050173 A1 | 2/2010 | Hensbergen |
| 2010/0293174 A1 | 11/2010 | Bennett et al. |
| 2011/0082962 A1 | 4/2011 | Horovitz et al. |
| 2011/0137966 A1* | 6/2011 | Srinivasan | H04L 67/1097 |
| | | | 707/828 |
| 2011/0185355 A1 | 7/2011 | Chawla et al. |
| 2011/0213884 A1 | 9/2011 | Ferris et al. |
| 2011/0258297 A1 | 10/2011 | Nightingale et al. |
| 2012/0096052 A1 | 4/2012 | Tolia et al. |
| 2012/0096205 A1 | 4/2012 | Velayudhan et al. |
| 2012/0210095 A1 | 8/2012 | Nellans et al. |
| 2012/0293886 A1 | 11/2012 | Abe et al. |
| 2012/0331065 A1 | 12/2012 | Aho et al. |
| 2012/0331243 A1 | 12/2012 | Aho et al. |
| 2013/0054523 A1 | 2/2013 | Anglin et al. |
| 2013/0103884 A1 | 4/2013 | Cho |
| 2013/0198472 A1 | 8/2013 | Fang et al. |
| 2013/0246431 A1 | 9/2013 | Ahuja et al. |
| 2013/0332608 A1 | 12/2013 | Shiga et al. |
| 2014/0095459 A1* | 4/2014 | Eshel | G06F 16/119 |
| | | | 707/703 |
| 2014/0279838 A1 | 9/2014 | Tsirogiannis et al. |
| 2014/0282626 A1 | 9/2014 | Muguda |
| 2014/0339117 A1 | 11/2014 | Quan et al. |
| 2014/0379840 A1 | 12/2014 | Dao |
| 2015/0012571 A1* | 1/2015 | Powell | G06F 3/0647 |
| | | | 707/827 |
| 2015/0046586 A1 | 2/2015 | Zhang et al. |
| 2015/0046600 A1 | 2/2015 | Kim |
| 2015/0079966 A1 | 3/2015 | Govindarajeswaran et al. |
| 2015/0208985 A1 | 7/2015 | Huang |
| 2015/0254325 A1 | 9/2015 | Stringham |
| 2015/0378767 A1 | 12/2015 | Tarasuk-Levin et al. |
| 2016/0048408 A1 | 2/2016 | Madhu et al. |
| 2016/0092326 A1 | 3/2016 | Wu et al. |
| 2016/0117226 A1 | 4/2016 | Hetrick et al. |
| 2016/0162547 A1* | 6/2016 | Morris | G06F 16/24542 |
| | | | 707/718 |
| 2016/0188407 A1 | 6/2016 | Bronnikov et al. |
| 2016/0207673 A1 | 7/2016 | Shlonsky et al. |
| 2016/0275125 A1 | 9/2016 | Drobychev et al. |
| 2016/0306643 A1 | 10/2016 | Klee et al. |
| 2017/0075909 A1 | 3/2017 | Goodson et al. |
| 2017/0091235 A1 | 3/2017 | Yammine et al. |
| 2017/0109421 A1 | 4/2017 | Stearn et al. |
| 2017/0235764 A1 | 8/2017 | Sharpe et al. |
| 2017/0235818 A1 | 8/2017 | Gorski et al. |
| 2017/0242746 A1 | 8/2017 | King et al. |
| 2017/0344575 A1 | 11/2017 | Naylor et al. |
| 2017/0351450 A1 | 12/2017 | Brandl et al. |
| 2018/0165161 A1 | 6/2018 | Slater et al. |
| 2018/0205791 A1 | 7/2018 | Frank et al. |
| 2018/0292999 A1 | 10/2018 | Nadkarni |
| 2018/0349463 A1 | 12/2018 | Bernhardy et al. |
| 2019/0004863 A1 | 1/2019 | Mainali et al. |
| 2019/0050296 A1 | 2/2019 | Luo et al. |
| 2019/0102256 A1 | 4/2019 | Murphy |
| 2019/0196885 A1 | 6/2019 | Song et al. |
| 2019/0207929 A1* | 7/2019 | Koorapati | G06F 3/0629 |
| 2019/0213175 A1 | 7/2019 | Kong et al. |
| 2019/0213179 A1 | 7/2019 | McHugh et al. |
| 2019/0227713 A1 | 7/2019 | Parthasarathy |
| 2019/0243547 A1* | 8/2019 | Duggal | G06F 3/0619 |
| 2019/0286465 A1 | 9/2019 | Cui et al. |
| 2019/0324874 A1 | 10/2019 | Gill et al. |
| 2019/0354544 A1 | 11/2019 | Hertz et al. |
| 2019/0370043 A1 | 12/2019 | Olderdissen |
| 2019/0370362 A1* | 12/2019 | Mainali | G06F 16/116 |
| 2019/0384678 A1 | 12/2019 | Samprathi et al. |
| 2019/0391843 A1 | 12/2019 | Franciosi et al. |
| 2020/0004570 A1 | 1/2020 | Glade et al. |
| 2020/0036787 A1 | 1/2020 | Gupta et al. |
| 2020/0042364 A1 | 2/2020 | Kumar Shimoga Manjunatha et al. |
| 2020/0104222 A1 | 4/2020 | Ramamoorthi et al. |
| 2020/0117637 A1 | 4/2020 | Roy et al. |
| 2020/0195743 A1 | 6/2020 | Jiang et al. |
| 2020/0201724 A1 | 6/2020 | Saito et al. |
| 2020/0250044 A1 | 8/2020 | Sharma et al. |
| 2020/0310859 A1 | 10/2020 | Gupta et al. |
| 2020/0310980 A1 | 10/2020 | Gupta et al. |
| 2020/0311116 A1 | 10/2020 | Anvaripour et al. |

(56) References Cited

U.S. PATENT DOCUMENTS

| | | |
|---|---|---|
| 2020/0314174 A1 | 10/2020 | Dailianas et al. |
| 2020/0319909 A1 | 10/2020 | Jawahar et al. |
| 2020/0387510 A1 | 12/2020 | Ransil et al. |
| 2020/0394078 A1 | 12/2020 | Taneja et al. |
| 2021/0026661 A1 | 1/2021 | Sulcer et al. |
| 2021/0034350 A1 | 2/2021 | Chen et al. |
| 2021/0064585 A1 | 3/2021 | Chen |
| 2021/0072917 A1 | 3/2021 | Surla et al. |
| 2021/0124651 A1 | 4/2021 | Srinivasan et al. |
| 2021/0181962 A1 | 6/2021 | Dai et al. |
| 2021/0294499 A1 | 9/2021 | Wang et al. |
| 2021/0406224 A1* | 12/2021 | Neufeld ............... G06F 16/1873 |

FOREIGN PATENT DOCUMENTS

| | | |
|---|---|---|
| WO | WO-2020/146043 A1 | 7/2020 |
| WO | WO-2021/119546 A1 | 6/2021 |
| WO | WO-2021/232109 A1 | 11/2021 |

OTHER PUBLICATIONS

Rivkind, Yael. Object Storage: Everything You Need to Know. <https://lakefs.io/blog/object-storage/> Nov. 25, 2020. (Year: 2020).*

B Tree Indexes. http://web.csulb.edu/-amonge/classes/common/db/B TreeIndexes.html, Aug. 4, 2018, pp. 1-7 (2018).

Stopford. Log Structured Merge Trees. http://www.benstopford.com/2015/02/14/ log-structured-merge-trees, 2015, pp. 1-8 (2015).

"AWS Pricing"; Amazon Web Services; https://aws.amazon.com/pricing/; Webpage accessed on Jun. 23, 2021; pp. 1-9.

"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.

"IT Service Provider Technology Solutions and Services"; HPE—Hewlett Packard; https://www.hpe.com/us/en/solutions/service-providers.html?parentPage=/us/en/solutions/service-providers; Webpage accessed on Jun. 23, 2021; pp. 1-6.

"Managed VMware Cloud Services"; VMware; https://cloud.vmware.com/providers/managed-services-provider; Webpage accessed on Jun. 23, 2021; pp. 1-5.

"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.

"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.

"Per Virtual Machine Licensing"; VMware Per VM Pricing & Licensing Help; https://www.vmware.com/support/support-resources/licensing/per-vm.html; Webpage accessed on Jun. 23, 2021; pp. 1-7.

"Storage Tiering"; VMware Docs; https://docs.vmware.com/en/VMware-Validated-Design/5.0/com.vmware.vvd.sddc-design.doc/GUID-20D2BC02-4500-462F-A353-F9B613CC07AC.html; webpage accessed on Jun. 18, 2021; pp. 1-3.

"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.

"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.

Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec. 5, 2016; pp. 1-5.

Luis Ayuso; "How to Report Monthly Usage with the Flex Pricing Model"; VMware Cloud Provider Blog; May 20, 2019; pp. 1-6.

Luis Ayuso; "How to Sign Up for the new VCPP Flex Pricing Model"; VMware Cloud Provider Blog; May 20, 2019; pp. 1-6.

Luis Ayuso; "New VCPP Pricing Model Simplifies Delivering Services"; VMware Cloud Provider Blog; May 20, 2019; pp. 1-6.

Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug. 12, 2015; pp. 1-6.

Wambler, Choosing a Primary Key: Natural or Surrogate? http://www.agiledata.org/essays/keys.html, 2018, pp. 1-4 (2018).

"Adding Objects to Versioning—Enabled Buckets", from https://docs.aws.amazon.com/AmazonS3/latest/dev/AddingObjectstoVersioningEnabledBuckets.html, (Oct. 2, 2019).

"Configure a Pod to Use a ConfigMap", from https://kubernetes.io/docs/tasks/configure-pod-container/configure-pod-configmap/,(Oct. 2, 2019).

"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.

"Deployments", from https://kubernetes.io/docs/concepts/workloads/controllers/deployment/, (Oct. 2, 2019).

"Retrieving Object Versions", from https://docs.aws.amazon.com/AmazonS3/latest/dev/RetrievingObjectVersions.html, (Oct. 2, 2019).

"Set up Cluster Federation with Kubefed—Kubernetes", from https://v1-14.docs.kubernetes.io/docs/tasks/federation/set-up-cluster-federation-kubefed/, (Apr. 17, 2020).

"SwiftOnFile"; Object Storage-Gluster Docs; v: release3.7.0beta1; https://staged-gluster-docs.readthedocs.io/en/release3.7.0beta1/Administrator%20Guide/Object%20Storage/; webpage accessed on Oct. 28, 2020; pp. 1-2.

"Volumes", from https://kubernetes.io/docs/concepts/storage/volumes/, (Oct. 2, 2019).

Cano, Ignacio, et al. "Curator: Self-Managing Storage for Enterprise Clusters" (Mar. 27, 2017), from https://www.usenix.org/conference/nsdi17/.

Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jan. 8, 2019.

The Nutanix Bible; from https://nutanixbible.com/; accessed on Jun. 8, 2017.

The Nutanix Bible; from https://nutanixbible.com/; accessed on Jun. 9, 2016.

(56) References Cited

OTHER PUBLICATIONS

"Adding objects to versioning-enabled buckets—Amazon Simple Storage Service.pdf," https://docs.aws.amazon.com/AmazonS3/latest/userguide/AddingObjectstoVersioningEnabledBuckets.html, pp. 1-2.
"Method:disks.get|Compute Engine Documentation|Google Cloud. pdf," https://cloud.google.com/compute/docs/reference/rest/v1/disks/get, pp. 1-17.
"NetApp ONTAP 9.7 Announced—StorageReview.com," (Jun. 14, 2019), https://www.peakresources.com/netapp-ontap-9-6-release-notes-and-thoughts/, pp. 1-5.
"PUT Object|Cloud Storage|Google Cloud," https://cloud.google.com/storage/docs/xml-api/put-object, pp. 1-3.
"Retrieving object versions from a versioning-enabled bucket—Amazon Simple Storage Service.pdf," https://docs.aws.amazon.com/AmazonS3/latest/userguide/RetrievingObjectVersions.html, pp. 1-3.
"Xml and More: OCI?Knowing Object Storage Basics" (Jan. 13, 2019), http://xmlandmore.blogspot.com/2019/01/ociknowing-object-storage-basics.html, pp. 1-6.
Amazon Simple Storage Service User Guide API Version Mar. 1, 2006 (Year: 2006).
Ballard, Brit, "Back to Basics: Writing SQL Queries," (Apr. 21, 2014), https://thoughtbot.com/blog/back-to-basics-sql, 1-17 pages.
Dellemc, "Elastic Cloud Storage (ECS)," (Aug. 2017), https://repository.usc.edu/sites/repository.usc.edu/files/ecs_overview.pdf. pp. 1-57.
Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.
F5, "Enable Single Namespace for VMware Horizon with View Deployments," https://www.f5.com/pdf/solution-center/vmware-single-namespace-overview.pdf, pp. 1-2.
FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.
Guess A.R., "Cloudian HyperStore 7 Multi-Cloud Data Management Unifies Public Cloud and On-Premises Storage—DATAVERSITY," (Jan. 29, 2018), https://www.dataversity.net/cloudian-hyperstore-7-multi-cloud-data-management-unifies-public-cloud-premises-storage/, pp. 1-4.
"How to use Indexing to Improve Database Queries," https://dataschool.com/sql-optimization/how-indexing-works/, pp. 1-12.
NetApp, "A Unified Platform for Cloud Storage Infrastructure," (Oct. 26, 2020), https://cloud.netapp.com/blog/cvo-blg-one-unified-platform-for-cloud-storage-infrastructure-and-data-services, pp. 1-8.
NetApp, "StorageGRID Solves Your Unstructured Data Management Problems|NetApp Blog," (Apr. 17, 2019), https://www.netapp.com/blog/storagegrid-solves-your-unstructured-data-management-problems/, pp. 1-6.
Oracle Multimedia User's Guide, 12c Release 1 (12.1), E17697-Jul. 9, 2014 (Year 2014).
Oracle SQL Developer User's Guide, Release 1.5, E12152-08, Jul. 2014 (Year: 2014); pp. 1-128.
Patel Kiran, Goynes Eddie, "Lower latency with AWS Elemental MediaStore chunked object transfer|AWS Media Blog," (Jul. 2, 2019), https://aws.amazon.com/blogs/media/lower-latency-with-aws-elemental-mediastore-chunked-object-transfer/, pp. 1-6.
Rupprecht Lukas, Zhangz Rui, Owen Bill, Pietzuch Peter, Hildebrandz Dean, "SwiftAnalytics: Optimizing Object Storage for Big Data Analytics," https://lsds.doc.ic.ac.uk/sites/default/files/swift-analytics_ic2e17_crv.pdf, pp. 1-7.
Sonobuoy, "Sonobuoy," https://sonobuoy.io/, 1-6 pages.
VM ware, "VMware Cloud Director Object Storage Extension Documentation.pdf," https://docs.vmware.com/en/VMware-Cloud-Director-Object-Storage-Extension/index.html, pp. 1-3.
VMware, "Introducing HCX Enterprise—Cloud Blog—VMware," (Aug. 8, 2019), https://blogs.vmware.com/cloud/2019/08/08/introducing-hcx-enterprise/, pp. 1-6.
VMware, "VMware HCX Enterprise: Non-vSphere to vSphere Workload Migration—Cloud Blog—VMware," (Aug. 8, 2019), https://blogs.vmware.com/cloud/2019/08/08/vmware-hcx-enterprise-non-vsphere-vsphere-workload-migration/, pp. 1-7.
VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.
Wikipedia, "Chunked transfer encoding," https://en.wikipedia.org/wiki/Chunked_transfer_encoding, pp. 1-4/.
Woodward Liz, "What Is Elastic Cloud Storage—A Guide to ECS in 2022," https://www.cloudwards.net/what-is-elastic-cloud-storage/, pp. 1-8.
"Choosing a load balancer for your object storage environment", NetApp 2020.
"NetApp StorageGRID", NetApp 2022.
"Tutorial: Transferring data from on-premises storage to Amazon S3 in a different AWS account", https://docs.aws.amazon.com/datasync/latest/userguide/s3-cross-account-transfer.html, accessed Dec. 12, 2022.
"What is AWS Data Sync?", https://docs.aws.amazon.com/datasync/latest/userguide/what-is-datasync.html, accessed Dec. 12, 2022.
Amazon, "Copy your data between on premises object storage and AWS using AWS DataSync", Jul. 27, 2020, https://aws.amazon.com/about-aws/whats-new/2020/07/copy-your-data-between-on-premises-object-storage-and-aws-using-aws-datasync/.
Cloudian, "HyperBalance Load Balancer", https://cloudian.com/products/hyperbalance/, accessed Dec. 12, 2022.
Cloudian, "On-Premises Object Storage: Building S3 in Your Backyard", https://cloudian.com/guides/hybrid-it/on-premises-object-storage/, accessed Dec. 12, 2022.
Cloudian, "S3 Backup: The Complete Guide", https://cloudian.com/blog/s3-backup-the-complete-guide/, accessed Dec. 12, 2022.
Cloudian, "Simple, Secure, Scalable. S3-Compatible, Cloud Native Data Management", https://cloudian.com/products/hyperstore/, accessed Dec. 12, 2022.
NetApp, "StorageGRID: Smart, fast, future-proof object storage", https://www.netapp.com/data-storage/storagegrid/, accessed Dec. 12, 2022.
Pritchard, Stephen, "Object Storage: On Prem, in the cloud and hybrid," (Sep. 27, 2018), https://www.computerweekly.com/news/252449283/Object-storage-On-prem-in-the-cloud-and-hybrid, pp. 1-8.
Sonobuoy Overview, https://sonobuoy.io/docs/v0.56.10/.
Final Office Action on U.S. Appl. No. 17/358,967 dated Feb. 22, 2023.
Non-Final Office Action on U.S. Appl. No. 17/358,967 dated Sep. 1, 2023.
Notice of Allowance on U.S. Appl. No. 16/526,894 dated Sep. 20, 2023.

* cited by examiner

```
┌─────────────────────────────────────────────────────────┐
│ Perform a first operation on an object using one of an object │
│ based access protocol or a file based access protocol in a unified │
│ namespace.                                              │
└─────────────────────────────────────────────────────────┘
                              │ 302
                              ▼
┌─────────────────────────────────────────────────────────┐
│ Lookup the object using a second one of the object based access │
│ protocol or the file based access protocol in the unified │
│ namespace                                               │
└─────────────────────────────────────────────────────────┘
                                                           304
```

CONCURRENT MULTIPROTOCOL ACCESS TO AN OBJECT STORAGE SYSTEM

CROSS-REFERENCE TO RELATED APPLICATION

This application is related to and claims priority under 35 U.S. § 119(a) the Indian Patent Application No. 202041051474, filed Nov. 26, 2020, titled "CONCURRENT MULTIPROTOCOL ACCESS TO AN OBJECT STORAGE SYSTEM," the entire contents of which are incorporated herein by reference for all purposes.

BACKGROUND

The following description is provided to assist the understanding of the reader.

Virtual computing systems are widely used in a variety of applications. Virtual computing systems include one or more host machines running one or more virtual machines and other entities (e.g., containers) concurrently. Modern virtual computing systems allow several operating systems and several software applications to be safely run at the same time, thereby increasing resource utilization and performance efficiency. However, the present-day virtual computing systems have limitations due to their configuration and the way they operate.

SUMMARY

In accordance with some aspects of the present disclosure, a non-transitory computer readable medium is disclosed. In some embodiments, the non-transitory computer readable medium includes instructions when executed by a processor cause the processor to write an object to an object store using an object-based access protocol, look up the object from the object store using a file-based access protocol, and create one or more directories on-demand in the object store.

In accordance with some aspects of the present disclosure, an apparatus is disclosed. In some embodiments, the apparatus includes a processor and a memory. In some embodiments, the memory includes programmed instructions that, when executed by the processor, cause the apparatus to write an object to an object store using an object-based access protocol, look up the object from the object store using a file-based access protocol, and create one or more directories on-demand in the object store.

In accordance with some aspects of the present disclosure, a method is disclosed. In some embodiments, the method includes writing an object to an object store using an object-based access protocol, looking up the object from the object store using a file-based access protocol, and creating one or more directories on-demand in the object store.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A workload in a virtualized environment can be configured to run software-defined object storage service. The workload (e.g., virtual machines, containers, etc.) may be configured to deploy (e.g., create) buckets, add objects to the buckets, lookup the objects, version the objects, maintain the lifecycle of the objects, delete the objects, delete the buckets, and the like. A bucket is like a folder except that a bucket has a flat hierarchy, whereas a folder has recursion (e.g., sub-folders). The buckets can be backed by physical storage resources that are exposed through a hypervisor. An object can be anything: a file, a document, a spreadsheet, a video, a data, metadata, etc.

Customers want the ability to use files to access objects that are stored in an object store. Some systems use a separate gateway appliance/layer that converts a file-based access to object access. However, these systems require that customers manage independent entities and independent namespaces, including temporarily creating a file in a file name space, then synchronizing (syncing) the file name space with the object store using an object application programming interface (API). These systems do not allow customers to leverage many of the object features such as writing objects partially, overwriting objects, and extending objects. In addition, there is added latency that comes with syncing the namespaces and accessing the object store. Moreover, the object store is not scalable—the gateway layer becomes the bottleneck as the capacity of the object store grows.

The present disclosure is generally directed to implementing file-based access protocols natively in the object store. Users can access objects with object protocol or file-based access protocol. Examples of file-based access protocol include network file system (NFS) protocol and server message block (SMB) protocol. The object store can include a unified namespace so there are no sync/cache coherency/consistency issues. The object store with embedded file-based access protocol can reduce latency as compared with gateway layer implementations. The object store can be scalable. Directories may be created on the fly, when access requests are made, so that unnecessary resources are not consumed. In some embodiments, the present disclosure receives an access request in file-based access protocol, identifies an object name, parses the name to identify directory names, and automatically creates intermediate directories. In some embodiments, the present disclosure determines that an object has been deleted, and automatically deletes the intermediate directories.

Figure 1:
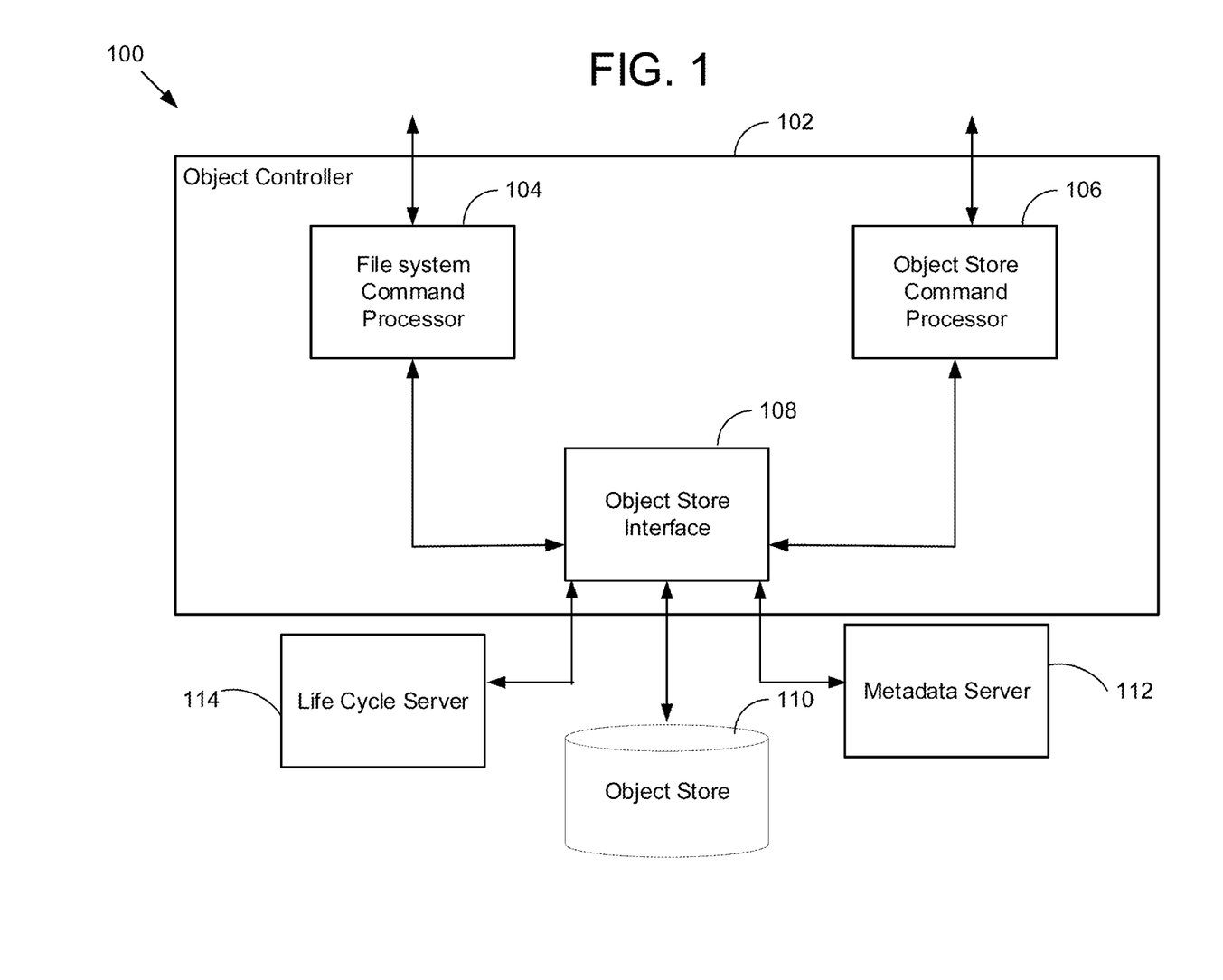
FIG. 1 is an example block diagram of an object store system with file-based access, in accordance with some embodiments of the present disclosure.

FIG. 1 is an example block diagram of an object store system 100 with file-based access, in accordance with some embodiments of the present disclosure. The object store system 100 includes the object controller 102, which manages object data and coordinates metadata updates with a metadata server 112.

The object controller 102 includes an object store command processor 106. The object store command processor 106 can process a command (e.g., request) using an object store protocol. The object store command processor 106 can receive the command at a first port of the object controller 102. Examples of object store protocols are S3 and Swift.

In some embodiments, the object store command processor 106 receives object write requests. In some embodiments, in receiving a write request, the object store command processor 106 instructs an object store interface 108 to write the object in an object store 110 (e.g., in a specified bucket). For example, the object store command processor 106 sends an instruction to the object store interface 108 to write object data of the object "A/B/C/foo.object." The object an also be referred to as the object name or the path name. The object store command processor 106 or the object store interface 108 can send an instruction to the metadata server 112 to create metadata for the object. The metadata server 112 can create and store the metadata in a memory or storage (e.g., log-structured memory). The object store command processor 106 can return an acknowledgement to the client that the object has been written.

In some embodiments, the object store command processor 106 receives object lookup (e.g., read) requests. As part of receiving a lookup request, the object store command processor 106 can receive an object (e.g., the object "A/B/C/foo.object"). The object store command processor 106 can send the object to the metadata server 112. Here, "AB/C" can be referred to as a prefix. The metadata server 112 can determine the corresponding metadata for the object, construct a file handle based on the object, and send the file handle back to the object store interface 108. In some embodiments, the metadata server 112 has a mapping data structure that maps the object to the file handle and the metadata server 112 can look up the file handle by locating the object in an index (e.g., row) in the mapping data structure and fetching the corresponding file handle at the same index. The object store interface 108 can fetch the object data from the object store 110 using the file handle and send the object data back to the object store command processor 106. The object store command processor 106 can return the object data to the client.

The object controller 102 includes the file system command processor 104. The file system command processor 104 can process a command using a file-based access protocol. In some embodiments, the command includes one or more arguments such as an object (e.g., a file name), a directory (e.g., a directory name), a file handle (e.g., cookie, opaque cookie, alias) of an object, a bucket, a file handle of a bucket, or an operation (e.g., create, lookup, delete). The namespace can be unified (e.g., a file handle of an object can be the same regardless of the protocol). The file system command processor 104 can receive the command at a second port of the object controller 102. The second port can be different from the first port.

In some embodiments, the file system command processor 104 receives write requests.

The file system command processor 104 can instruct the object store interface 108 to store the file in the object store 110. In some embodiments, the file is stored in the object store 110. In some embodiments, the file system command processor 104 creates, or instructs the object store interface 108 or the metadata server 112 to create, directories upon the file being created. In some embodiments, inodes (metadata) are created for the directories and files and stored in the storage/memory associated with the metadata server 112.

In some embodiments, the file system command processor 104 receives file (e.g., object) or directory lookup requests. In receiving a lookup request for a directory, the file system command processor 104 can receive a directory name. If the file system command processor 104 receives a directory name, and the directory exists (e.g., the metadata for the directory exists), the file system command processor 104 can return the directory file handle.

Upon receiving a directory name, the file system command processor 104 can determine if a directory file handle associated with the directory name exists. For example, if the file system command processor 104 receives the directory "A," the file system command processor 104 determines whether a file handle associated with "A" exists. The determination can be done by looking up the inode for "A" in the metadata server. If an inode exists, the file system command processor 104 can fetch the file handle. If the inode does not exist, the file system command processor 104 determines that the file handle does not exist.

In some embodiments, the file system command processor 104 creates the directory based on determining that (a) the directory does not exist and (b) a prefix of an existing object includes the directory. That is, the file system command processor 104 can create the directory structure on-demand. The on-demand creation of a directory can be referred to as an implicitly created directory. Entire directory structures (e.g., one or more directories arranged in a hierarchy) can be created on-demand. For example, if an object "A/B/C/foo.object" exists, and the file system command processor 104 determines the directory "A" does not exist, upon a lookup request of "A," the file system determines that "A" is in the prefix of the object "A/B/C/foo.object." In some embodiments, file system command processor 104 parses "A/B/C/foo.object" to identify "A." Based on identifying "A," the file system command processor 104 can create the directory "A" or instruct the object store interface 108 or metadata server 112 to create the directory "A." In some embodiments, in creating the directory "A," the file system command processor 104 creates/instructs creation of metadata from which a file handle can be fetched/retrieved. Then, the file system command processor 104 can fetch and return the file handle to the client.

In the same regard, if an object "A/B/C/foo.object" exists, and the file system command processor 104 receives a request for "B," the file system command processor 104 can parse "A/B/C/foo.object" to identify "A" and "B." So long as "A" exists, the file system command processor creates "B."

However, if a directory does not exist and a prefix of an object does not include the directory, the file system command processor 104 can return an error to the client. For example, if an object "A/B/C/foo.object" exists, and the file system command processor 104 receives a request for the directory "D," the file system command processor 104 returns an error.

In receiving a lookup request for a file, the file system command processor 104 can receive a file handle (e.g., of the root, the bucket, or a parent folder) corresponding with a file. If the file system command processor 104 receives a file handle, the file system command processor 104 can look up the file in the object store 110 (or via the object store interface 108 or the metadata server 112). The file system command processor 104 can fetch the file and return the file to the client.

The file system command processor 104 can automatically delete (e.g., garbage collects) the implicitly created directories when the object which is responsible for their automatic creation is deleted. For example, if the object "A/B/C/foo" is deleted, a directory structure "AB/C" exists, and no other objects are using the same directory, the file system command processor 104 automatically deletes the implicitly created directories. In some embodiments, one or more of the metadata or the file handle of the deleted directory gets deleted.

Once the object and the corresponding directories are deleted, a lookup of the corresponding directories can return an error (unless other existing objects are in the same directories). For example, if "A/B/C/foo" is deleted, and as a result, "A" is deleted, then, upon receiving a request for "A," the file system command processor 104 determines that "A" does not exist in any prefix of any object, and the file system command processor 104 returns an error to the client.

In some embodiments, the object file handle is a persistent file handle. As a result, the implicitly created directories are can be accessed through the persistent file handle even after some event that would reset any temporary configurations. For example, if after file system command processor 104 receives the file handle, the object store 110 restarts, the object remains accessible through the same file handle.

The file system command processor 104 supports versioning. In some embodiments, the file system includes snapshots of an object. The file system command processor 104 can take a snapshot every time the object is written to and map the snapshot to a corresponding version. The mapping can be stored in the object store 110. Upon receiving a request for a snapshot, the file system command processor 104 (or the object store 110) can fetch the map to determine the version of the object corresponding to the snapshot.

The file system command processor 104 supports WORM (write once read many) functionality. The file system command processor 104 can support out of order first writes over a file-based access of the object store 110. The file system command processor 104 can support writes over a file-based access of the object store 110. The file system command processor 104 can support overwrites over a file-based access of the object store 110.

In some embodiments, the object controller 102 includes the object store interface 108 in communication with the file system command processor 104 and the object store command processor 106. The object store interface 108 may interface between each of the processors 104 and 106, the object store 110, and other services. In some embodiment, the object store interface 108 receives an instruction based on the command (e.g., in a first format) and sends an instruction to the object store 110 (e.g., in a second format, wherein the second format is translated from the first format).

In some embodiments, the object store system 100 includes the object store 110 in communication with the object store interface 108. In some embodiments, the object store 110 includes the object that the command operates on. In some embodiments, the object store includes buckets, and each of the buckets are configured to store objects. The object store 110 may include, but is not limited to temporary memory device such as a random access memory (RAM) device and/or non-volatile memory (NVM, e.g., persistent memory) such as non-volatile dual in-line memory modules (NVDLMM), a read only memory (ROM) device, any type of magnetic storage devices (e.g., hard disk, floppy disk, magnetic strips, etc.), optical disks (e.g., compact disk (CD), digital versatile disk (DVD), etc.), smart cards, solid state devices, etc.

In some embodiments, the object store system 100 includes the metadata server 112 in communication with the object store interface 108. The metadata server 112 can contain some or all of the metadata around an object store deployment. In some embodiments, the metadata server 112 leverages a key-value store for storage of the metadata.

In some embodiments, the object store system 100 includes a life cycle server 114. The life cycle server 114 can control life cycle management, audits, and background maintenance activities.

Each of the components (e.g., elements, entities) of the system 100 (e.g., the object controller 102, the file system command processor 104, the object store command processor 106, the object store interface 108, the object store 110, and the metadata server 112, the life cycle server 114), is implemented using hardware, software, or a combination of hardware or software, in one or more embodiments. Each of the components of the system 100 may be a processor with instructions or an apparatus/device (e.g., server) including a processor with instructions, in some embodiments. In some embodiments, multiple components (e.g., the discovery engine 160 and the cloud control plane 180) may be part of a same apparatus and/or processor. Each of the components of the system 100 can include any application, program, library, script, task, service, process or any type and form of executable instructions executed by one or more processors, in one or more embodiments. Each of the one or more processors is hardware, in some embodiments. The instructions may be stored on one or more computer readable and/or executable storage media including non-transitory storage media.

In some embodiments, the object store may be integrated with, or run on top of, a hyper-converged infrastructure (HCI) cluster (e.g., HCI, HCI cluster, cluster, etc.). An HCI cluster is one or more virtualized workloads (one or more virtual machines, containers, etc.) that run services/applications/operating systems by using storage and compute resources of one or more nodes (e.g., hosts, computers) which are virtualized through a hypervisor. Thus, the cluster refers to the cluster of physical nodes as well as the cluster of workloads. The cluster can be located in one node, distributed across multiple nodes in one data center (on-premises) or cloud, or distributed across multiple data centers, multiple clouds or data center-cloud hybrid. At least one of the workloads (e.g., a controller virtual machine or container) in the cluster runs core services that manages and maintains the cluster, including a cluster manager, a health/ wellness check manager, an I/O storage manager, and the like. In some embodiments, a workload manages multiple clusters.

Sparse files, overwrites, and extending writes can be handled by the object store system 100. In some embodiments, a sparse file is created when some offset of a file is not written to and instead skipped over before writing to higher offsets. For such cases, the object store only allocates the containing block (e.g., the part of the file that was written to) in the object store. Through a simple buddy scheme, the system can efficiently handle extending writes. For example, assuming 5 TiB is the maximum ObjectSize: Small Objects: 9 entries. Size of Location Identifier entries: 8 KiB+8 KiB+16 KiB+32 KiB+64 KiB+128 KiB+256 KiB+512 KiB+1 MiB. Large Objects: 10 (upto 1 GiB)+5119 (rest of the 5 TiB)=5129. Size of location Identifier entries: 2 MiB+2 MiB+4 MiB+8 MiB+16 MiB+32 MiB+64 MiB+128 MiB+ 256 MiB+512 MiB+1 GiB+1 GiB. Overwrites are handled by writing in place if versioning is disabled. If versioning is enabled, new versions can be created by using internal object copy functionality.

In some embodiments, objects are replicated independently by virtue of the fact that a directory superstructure can be automatically derived on the target. The writes to a file can trickle in one block at a time so it can be better to wait until the entire file has been written before the object store system 100 can start the replication. Otherwise the object store system 100 can determine the offset that needs to be replicated. The object store system 100 can record that a file is being written and would be replicated when the file has been written. When the file has been written, the object controller (OC) 102 can initiate replication and mark the file as done when replication finishes. The file-based access protocol may not maintain MD5 checksums. If new writes come in while replication is going on, the object store system 100 can restart replication. The object store system 100 can replicate only the metadata.

Figure 2A:
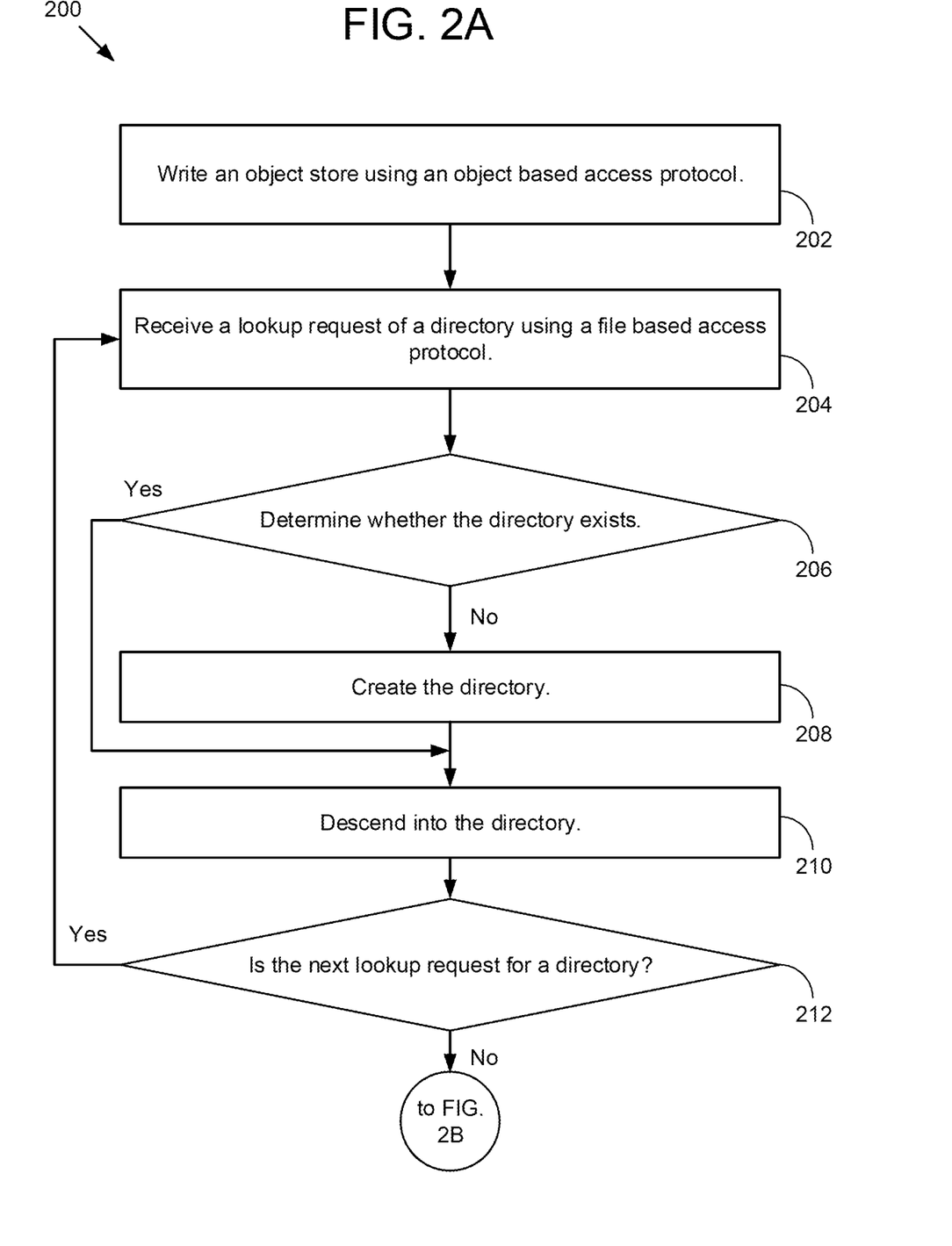
FIGS. 2A-2B are an example flowchart of a method, in accordance with some embodiments of the present disclosure.
Figure 2B:
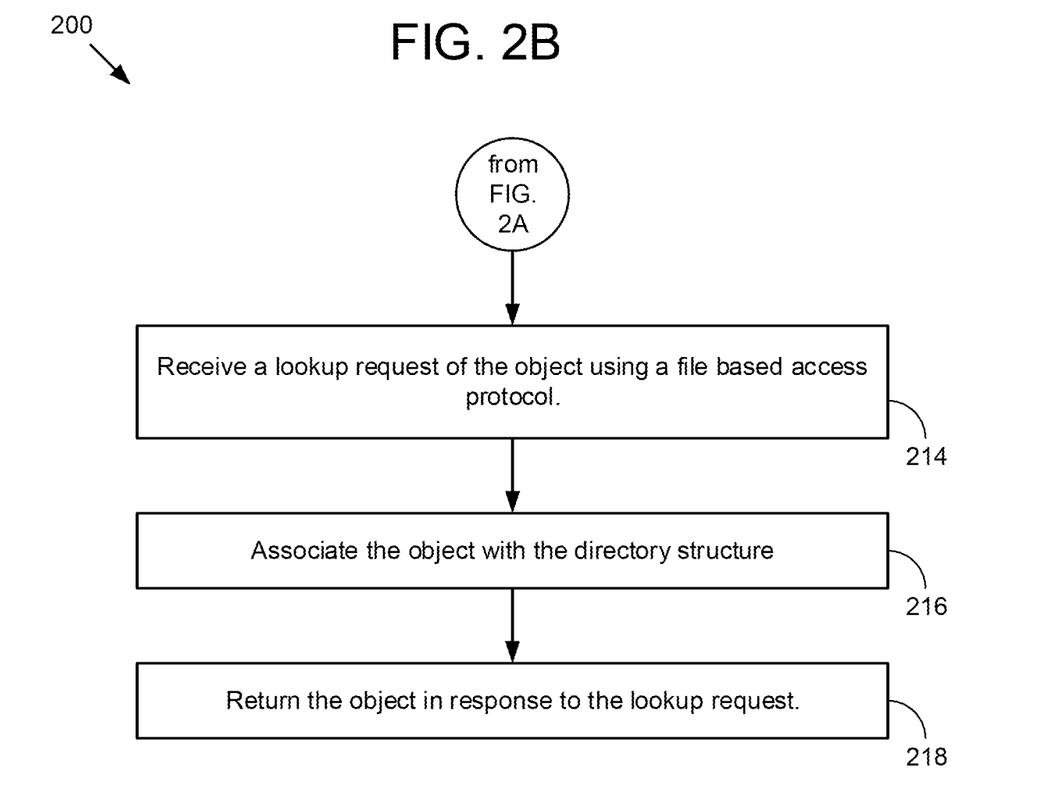

Referring now to FIGS. 2A-2B, a flowchart of an example method 200 is illustrated, in accordance with some embodiments of the present disclosure. The method 200 may be implemented using, or performed by, the object store system 100, one or more components of the object store system 100, or a processor associated with object store system 100 or the one or more components of object store system 100. Additional, fewer, or different operations may be performed in the method 200 depending on the embodiment.

A processor (e.g., the object controller 102, the file system command processor 104, the object store command processor 106, or a combination thereof) writes an object in an object store using an object-based access protocol (202). The processor receives a lookup request of a directory using a file-based access protocol (204). The processor determines whether the directory exists (206). If the processor determines that the directory does not exist, the processor creates the directory (208) and proceeds to operation 210. If the processor determines that the directory exists, the processor descends into the directory (210).

The processor determines whether the next lookup request is for a directory (212). If the processor determines whether the next lookup request is for a directory, the processor returns to operation 204. If the processor determines whether the next lookup request is not for a directory (e.g., the next lookup request is for an object), the processor receives the lookup request of the object, wherein the lookup request uses a file-based access protocol (214). The processor associates the object with the directories that the processor has descended into (e.g., the directory path) (216). The processor returns the object in response to the lookup request (218). In some embodiments, in subsequent lookup requests for the same object, the processor descends into the same directory path to return the object.

In some embodiments, the processor implements a unified namespace for the file-based access and the object-based access. Namespace is described in further detail with respect to FIG. 3. In some embodiments, the processor enables object features like versioning and WORM for file-based access. Object features are described in further detail with respect to FIG. 4. In some embodiments, if the object is deleted, the processor deletes the one or more directories. Deletion (e.g., on-demand deletion) of directories is described in further detail with respect to FIG. 5.

The method 200 has various benefits. One benefit is that the directories are created on-demand. This feature is critical for big data and analytics use cases, where terabytes of data are stored in an object store. Typical systems needlessly consume large amount of memory and compute resources creating directories when the data may be infrequently accessed or never accessed at all. Advantageously, the method 200 creates the directories when the user/client sends a lookup request. This minimizes the resources that are consumed while still providing the user with NFS access of an object store.

Figure 3:
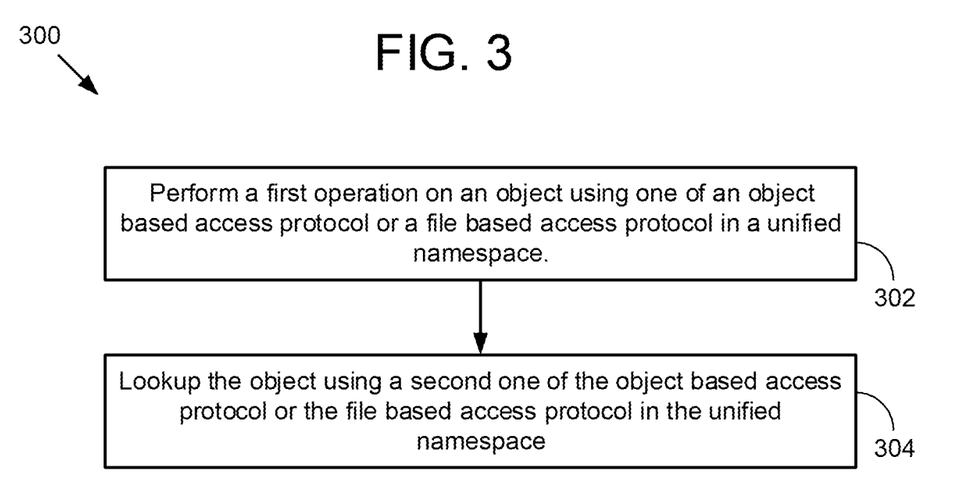
FIG. 3 is an example flowchart of a method, in accordance with some embodiments of the present disclosure.

Referring now to FIG. 3, a flowchart of an example method 300 is illustrated, in accordance with some embodiments of the present disclosure. The method 300 may be implemented using, or performed by, the object store system 100, one or more components of the object store system 100, or a processor associated with object store system 100 or the one or more components of object store system 100. Additional, fewer, or different operations may be performed in the method 300 depending on the embodiment. In some embodiments, one or more operations of the method 300 can be combined with one or more operations of the method 200.

A processor (e.g., the object controller 102, the file system command processor 104, the object store command processor 106, or a combination thereof) performs a first operation (e.g., write, lookup, delete, etc.) an object using an object based access protocol in a unified namespace (302). The processor performs a second operation (e.g., write, lookup, delete, etc.) on an object using a file-based access protocol in the unified namespace (304). Thus, the namespace is unified. Advantageously, this allows multiple clients to use different protocols and still have instantaneous access to the same namespace and data.

Figure 4:
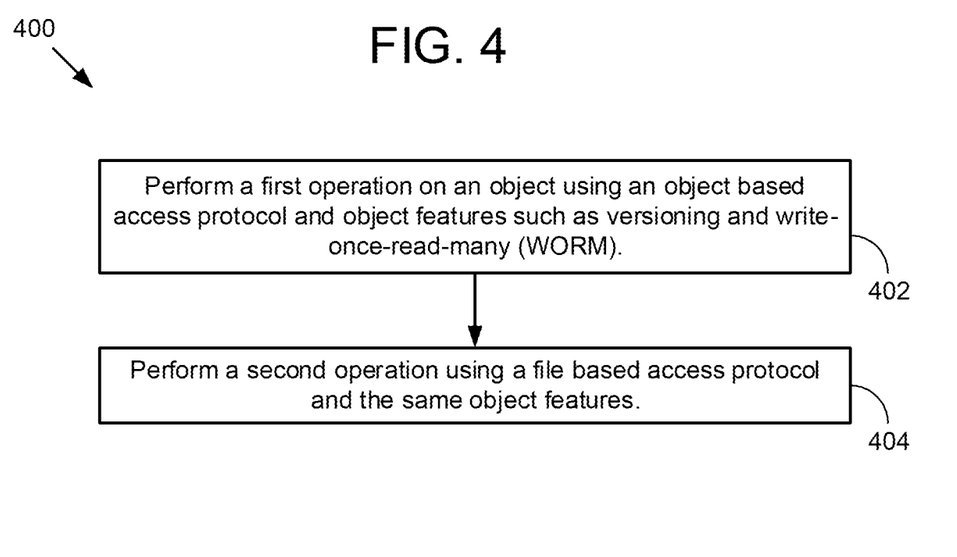
FIG. 4 is an example flowchart of a method, in accordance with some embodiments of the present disclosure.

Referring now to FIG. 4, a flowchart of an example method 400 is illustrated, in accordance with some embodiments of the present disclosure. The method 400 may be implemented using, or performed by, the object store system 100, one or more components of the object store system 100, or a processor associated with object store system 100 or the one or more components of object store system 100. Additional, fewer, or different operations may be performed in the method 400 depending on the embodiment. In some embodiments, one or more operations of the method 400 can be combined with one or more operations of the methods 200-300.

A processor (e.g., the object controller 102, the file system command processor 104, the object store command processor 106, or a combination thereof) writes an object using an object-based access protocol and object features such as versioning and write-once-read-many (WORM) (402). The processor looks up an object using a file-based access protocol and the same object features (404). In some embodiments, the processor enables such features over the file-based access protocol to provide best of both worlds for legacy applications wanting to consume storage using traditional file access protocols but require administration convenience of objects Referring now to FIG. 5, a flowchart of an example method 500 is illustrated, in accordance with some embodiments of the present disclosure. The method 500 may be implemented using, or performed by, the object store system 100, one or more components of the object store system 100, or a processor associated with object store system 100 or the one or more components of object store system 100. Additional, fewer, or different operations may be performed in the method 500 depending on the embodiment. In some embodiments, one or more operations of the method 500 can be combined with one or more operations of the methods 200, 300, or 400.

Figure 5:
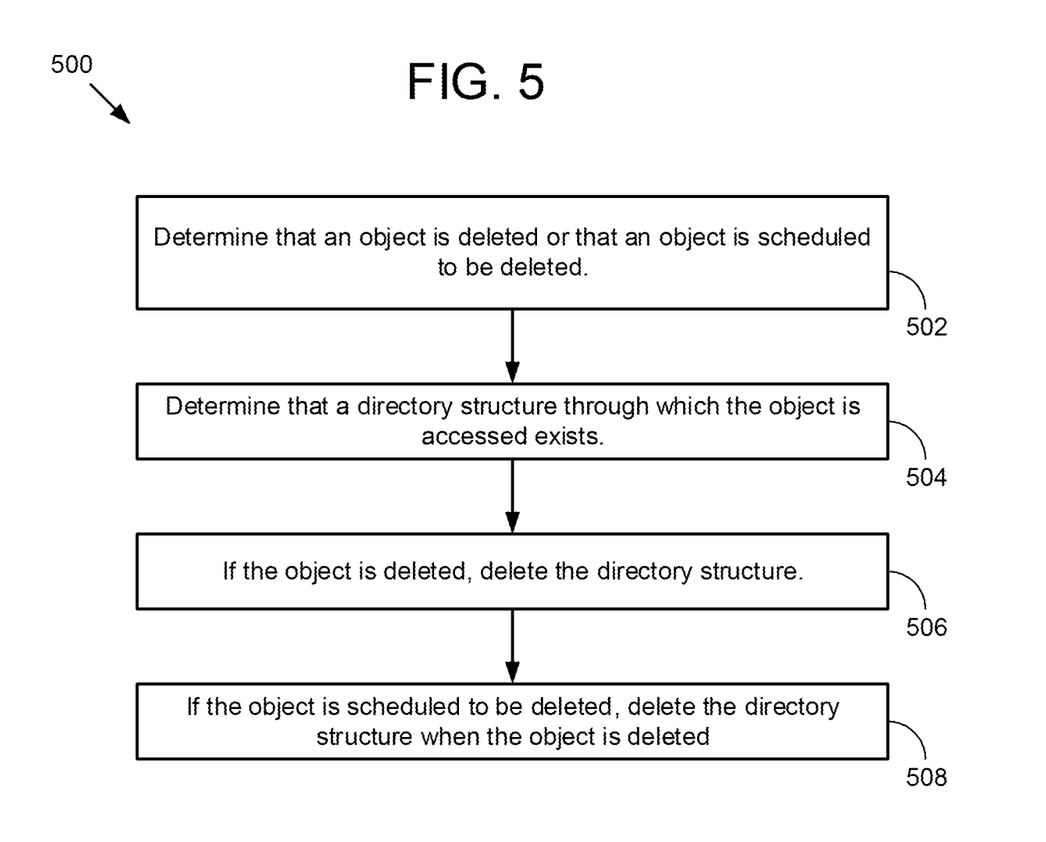
FIG. 5 is an example flowchart of a method, in accordance with some embodiments of the present disclosure.

A processor (e.g., the object controller 102, the file system command processor 104, the object store command processor 106, or a combination thereof) determines that an object is deleted or that an object is scheduled to be deleted (502). In some embodiments, the processor receives an indication as such from another component (e.g., the object store interface 108 or the object store 110). In some embodiments, the processor determines that a directory structure through which the object is accessed exists (504). In some embodiments, the processor determines that the directory structure is dedicated to the object (e.g., there is no other object accessed through the same directory structure). If the object is deleted, the processor deletes the directory structure (506). If the object is scheduled to be deleted, the processor deletes the directory structure when the object is deleted (508).

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A non-transitory computer readable medium comprising instructions that, when executed by a processor, cause the processor to:
   write an object to a bucket of an object store using an object-based access protocol in a unified namespace, wherein the bucket is backed by a virtualized physical storage resource; and
   in response to a request to look up the object using a file-based access protocol in the unified namespace, look up the object from the object store and create one or more directories on-demand in the object store.

2. The medium of claim 1, further comprising instructions that, when executed by the processor, cause the processor to parse the object to identify the one or more directories.

3. The medium of claim 1, further comprising instructions that, when executed by the processor, cause the processor to determine whether a directory of the one or more directories exists based on a prefix of the object.

4. The medium of claim 3, further comprising instructions that, when executed by the processor, cause the processor to create the directory in memory in response to determining that the directory does not exist.

5. The medium of claim 3, further comprising instructions that, when executed by the processor, cause the processor to descend into the directory in response to creating the directory.

6. The medium of claim 1, further comprising instructions that, when executed by the processor, cause the processor to delete the one or more directories in response to determining that the object is deleted.

7. The medium of claim 1, wherein the unified namespace is used by a plurality of clients connected to a network.

8. The medium of claim 1, wherein looking up the object using the file-based protocol does not require synchronizing the unified namespace with the object store.

9. The medium of claim 1, wherein writing the object to the bucket of the object store using the object-based access protocol includes writing the object with a file handle, and wherein looking up the object using the file-based access protocol includes looking up the object with the file handle.

10. An apparatus comprising a processor and a memory, wherein the memory includes programmed instructions that, when executed by the processor, cause the apparatus to:
   write an object to a bucket of an object store using an object-based access protocol in a unified namespace, wherein the bucket is backed by a virtualized physical storage resource; and
   in response to a request to look up the object using a file-based access protocol in the unified namespace, look up the object from the object store and create one or more directories on-demand in the object store.

11. The apparatus of claim 10, wherein the memory further includes programmed instructions that, when executed by the processor, cause the apparatus to parse the object to identify the one or more directories.

12. The apparatus of claim 10, wherein the memory further includes programmed instructions that, when executed by the processor, cause the apparatus to determine whether a directory of the one or more directories exists based on a prefix of the object.

13. The apparatus of claim 12, wherein the memory further includes programmed instructions that, when executed by the processor, cause the apparatus to create the directory in memory in response to determining that the directory does not exist.

14. The apparatus of claim 12, wherein the memory further includes programmed instructions that, when executed by the processor, cause the apparatus to descend into the directory in response to creating the directory.

15. The apparatus of claim 10, wherein the memory further includes programmed instructions that, when executed by the processor, cause the apparatus to delete the one or more directories in response to determining that the object is deleted.

16. The apparatus of claim 10, wherein the unified namespace is used by a plurality of clients connected to a network.

17. The apparatus of claim 10, wherein looking up the object using the file-based protocol does not require synchronizing the unified namespace with the object store.

18. The apparatus of claim 10, wherein writing the object to the bucket of the object store using the object-based access protocol includes writing the object with a file handle, and wherein looking up the object using the file-based access protocol includes looking up the object with the file handle.

19. A computer-implemented method comprising:
   writing an object to a bucket of an object store using an object-based access protocol in a unified namespace, wherein the bucket is backed by a virtualized physical storage resource; and
   in response to a request to look up the object using a file-based access protocol in the unified namespace, looking up the object from the object store and creating one or more directories on-demand in the object store.

20. The method of claim 19, further comprising parsing the object to identify the one or more directories.

21. The method of claim 19, further comprising determining whether a directory of the one or more directories exists based on a prefix of the object.

22. The method of claim 21, further comprising creating the directory in memory in response to determining that the directory does not exist.

23. The method of claim 19, further comprising deleting the one or more directories in response to determining that the object is deleted.

24. The method of claim 19, wherein the unified namespace is used by a plurality of clients connected to a network.

25. The method of claim 19, wherein looking up the object using the file-based protocol does not require synchronizing the unified namespace with the object store.

26. The method of claim 19, wherein writing the object to the bucket of the object store using the object-based access protocol includes writing the object with a file handle, and wherein looking up the object using the file-based access protocol includes looking up the object with the file handle.

* * * * *